United States Patent [19]

Brill

[11] Patent Number: 4,661,337

[45] Date of Patent: Apr. 28, 1987

[54] PREPARATION OF HYDROGEN PEROXIDE

[75] Inventor: William F. Brill, Skillman, N.J.

[73] Assignee: The Halcon SD Group, Inc., Little Ferry, N.J.

[21] Appl. No.: 799,065

[22] Filed: Nov. 18, 1985

[51] Int. Cl.$^4$ ............................................ C01B 15/02
[52] U.S. Cl. .................................................. 423/584
[58] Field of Search ...................................... 423/584

[56] References Cited

U.S. PATENT DOCUMENTS

| | | | |
|---|---|---|---|
| 1,108,752 | 8/1914 | Henkel et al. | 423/584 |
| 3,361,533 | 1/1968 | Hooper et al. | 423/584 |
| 4,007,256 | 2/1977 | Kim et al. | 423/584 |
| 4,128,627 | 12/1978 | Dyer et al. | 423/584 |
| 4,279,883 | 7/1981 | Izumi et al. | 423/584 |
| 4,303,632 | 12/1981 | Gosser | 423/584 |
| 4,335,092 | 6/1982 | Dalton, Jr. et al. | 423/584 |
| 4,336,239 | 6/1982 | Dalton, Jr. et al. | 423/584 |
| 4,336,240 | 6/1982 | Moseley et al. | 423/584 |
| 4,347,232 | 8/1982 | Michaelson | 423/584 |
| 4,462,978 | 7/1984 | Brill | 423/584 |

FOREIGN PATENT DOCUMENTS 0132294  3/1985  European Pat. Off. ............ 423/584

Primary Examiner—John Doll
Assistant Examiner—Wayne A. Langel
Attorney, Agent, or Firm—Harold N. Wells

[57] ABSTRACT

Hydrogen peroxide is produced by reacting hydrogen and oxygen in an acidic aqueous solution containing suspended therein a supported Group VIII noble metal catalyst in a system wherein the reaction medium has a thickness of at most about 2 millimeters.

11 Claims, No Drawings

PREPARATION OF HYDROGEN PEROXIDE

This invention relates to the preparation of hydrogen peroxide and is more particularly concerned with a process which produces hydrogen peroxide of increased concentration.

Hydrogen peroxide is a material of substantial chemical importance which is used in large volumes for various chemical oxidations and for bleaching On an industrial scale, hydrogen peroxide is primarily produced by the alternative oxidation and reduction of anthraquinone or the oxidation of isopropanol.

Other methods of producing hydrogen peroxide have been studied. One method of interest with respect to the present invention is the direct oxidation of hydrogen with gaseous oxygen, generally in the presence of a catalyst. Such a process was known at least as early as 1914; for example, see U.S. Pat. No. 1,108,752 to Henkel et al. In that patent hydrogen and oxygen were reacted in the presence of palladium as a catalyst in a water solution. More recently, considerable interest has been shown in further development of this process. In U.S. Pat. No. 4,007,256, Kim et al employ a supported palladium catalyst and a solvent comprising water, acid, and a nitrogen-containing compound. Dalton et al U.S. Pat. No. 4,336,239 discloses a similar system using an acidic organic or nitrogenous compound as a solvent. Hooper et al, in U.S. Pat. No. 3,361,533, disclose the use of Group I or Group VIII metals, preferably palladium supported on a solid and employ a reaction medium comprising water, acid, or oxygen-containing organics such as acetone. Alternative schemes are represented by Dyer et al U.S. Pat. No. 4,128,627 who employ a Group VIII metal, preferably palladium, which is linked to Group VB compounds, preferably phosphorus. Again, water and organic materials are used as solvents. Moseley et al in U.S. Pat. No. 4,336,240 show a similar system but employ fluorocarbons as solvents. Gosser U.S. Pat. No. 4,303,632 uses a diaryl ketone as solvent. Dalton et al U.S. Pat. No. 4,335,092 employs a palladium catalyst in methanol containing formaldehyde, while Michaelson U.S. Pat. No. 4,347,232 discloses the use of palladium complexes such as a complex of dibenzylidene acetone as the catalyst. European patent application No. 0 132 294 discloses a catalytic process for making hydrogen peroxide using palladium on carbon in a specified ratio and run in an aqueous medium containing substantially no organic component.

An objective of these prior proposals has been the production of a solution of hydrogen peroxide of increased hydrogen peroxide concentration. Thus, in European patent application No. 0 132 294 it is stated that the procedure disclosed permits production of hydrogen peroxide in concentrations greater than heretofore possible. The examples show concentrations of about 9% to about 25% by weight.

It is an object of the present invention to provide a process for producing hydrogen peroxide which requires the use of no organic solvents, no pretreatment of the catalyst, nor the use of a special type of catalyst, yet ensures the preparation of an aqueous hydrogen peroxide solution of increased hydrogen peroxide concentration.

Other objects and features of the invention will be apparent from the following detailed description of the novel process of this invention.

In accordance with the invention, hydrogen and oxygen are reacted in the presence of an aqueous reaction mixture under superatmospheric pressure in the presence of a supported palladium catalyst under liquid-phase conditions wherein the reaction mixture is stirred so that it is caused to climb the walls of the reaction vessel in order to form a substantially continuous layer of reaction mixture having a thickness of no more than about 2 millimeters. The concentration of hydrogen peroxide depends on the reaction time, but reaction times of 2 hours or less are usually adequate to produce relatively high concentrations, and ordinarily at least about ½ hour reaction time should be employed. Since CO has been found to have an adverse effect upon the reaction, the presence of CO should be eliminated and the hydrogen and oxygen used for the reaction should be essentially free from CO.

The catalyst is in the form of a layer of palladium metal deposited upon a support which may be silica, activated carbon, alumina, titanium dioxide, hydrous silicic acid, silica-alumina, clay, and the like, and is suitably prepared by conventional techniques such as the deposition of a soluble salt, e.g., the chloride or nitrate of palladium, followed by reduction at elevated temperatures with hydrogen, such as described in Izumi et al U.S. Pat. No. 4,279,883, the disclosure of which is incorporated herein by reference. The ratio of palladium to the support or carrier can vary but is normally 2–5 wt. %, the upper limit being more or less a practical one. Preferably, 5 wt. % palladium is supported by the support or carrier. The concentration of catalyst in the reaction mixture is ordinarily about 0.01–1%, preferably 0.2%, by weight of the total reaction mixture. Best results have been found to be obtained with particles of catalyst that are smaller than about 300 mesh in size, but larger particles can be used, although preferably they should not be greater than about 60 mesh.

It is a characteristic feature of the process of this invention that liquid-phase aqueous bodies of hydrogen peroxide free from organic additives are produced in relatively high concentrations.

The process is, as mentioned, carried out at superatmospheric pressure and total pressures of about 500 to 2,000 psig can be employed. Suitably, the partial pressure of oxygen lies within the range of 200 to 750 psi and the partial pressure of hydrogen lies within the range of 100 to 250 psi, but the ratio of oxygen to hydrogen should be about 3:1 to 0.5:1. Ratios of 2:1 are preferred to obtain best results.

Inert components such as argon, nitrogen, and the like may be present with the hydrogen and oxygen, but they generally are limited in amount by practical equipment considerations so that the total pressure is not excessive when the desired partial pressures of oxygen and hydrogen are employed.

As previously mentioned, no organic component is present in the reaction mixture, by which we mean that no added organic component is employed. Traces of organic components which may be present as impurities, e.g., up to about 6% of the reaction mixture, may, however, be present. The reaction mixture is composed not only of water, but it also is acidic. The water can be made acidic by any strong protonic acid such as hydrochloric, phosphoric, sulfuric, perchloric, and the like, although hydrochloric acid is preferred. It is desirable that the concentration of hydrogen ion in the reaction mixture be from about 0.1–1 mole.

The process can be carried out at 0°–30° C. and preferably a temperature of 5°–15° C. is employed. Lower temperatures can be used as long as the mixture is not caused to freeze, and higher temperatures can also be employed, although there is no necessity for temperatures above about 30° C.

The following examples will serve to illustrate the process of this invention, but it is not intended that they be limitative of the invention in any way. In Examples 1–12 the apparatus employed was a 300 cc. Teflon-coated autoclave having a glass liner and provided with a stirrer having a relatively wide Teflon stirring member positioned close (about 1 mm.) to the bottom of the liner.

EXAMPLE 1

The apparatus just described was charged with 10 cc. of water acidified with HCl to provide a 0.1 M solution of the HCl and containing suspended therein 0.02 g. of a catalyst composed of 5% palladium on activated carbon powder (Strem). With rapid stirring, hydrogen and oxygen were passed into the reactor to provide a hydrogen partial pressure of 250 psi and an oxygen partial pressure of 750 psi, and reaction was continued for 4 hours at 10° C. with the agitation effective to form a continuous layer of reaction mixture on the walls of the liner of about 1 millimeter in thickness. At the end of the 4-hour reaction period, it was found that hydrogen peroxide was present in a concentration of 5.69 M, corresponding to an about 19.5 wt. % solution.

EXAMPLE 2

Example 1 was repeated using a hydrogen partial pressure of 250 psi but an oxygen partial pressure of 500 psi. The hydrogen peroxide present was found to be in a concentration of 5.18 M, corresponding to a solution of about 17.6 wt. %.

EXAMPLE 3

Example 2 was repeated except that the reaction time was 2 hours. The hydrogen peroxide was found to be in a concentration of 5.10 M, corresponding to a 17.3 wt. % solution.

EXAMPLE 4

Example 3 was repeated except that the catalyst employed was 0.02 g. of 4.8% palladium on titanium dioxide. After the 2-hour reaction period, the concentration of hydrogen peroxide was found to be 2.01 M, corresponding to a 6.8 wt. % solution.

EXAMPLE 5

Example 1 was again repeated except that the partial pressure of hydrogen was 166 psi and the partial pressure of oxygen was 500 psi. The hydrogen peroxide was present in a concentration of 4.16 M, corresponding to a solution of about 14.2 wt. %.

EXAMPLE 6

Again repeating Example 1 but using an oxygen partial pressure of 500 psi, the hydrogen peroxide concentration after the 4-hour reaction period was found to be 5.18 M, corresponding to a solution of about 17.6 wt. %.

EXAMPLE 7

Example 1 was again repeated but the catalyst employed was 0.02 g. of 5% palladium on silicon dioxide, and hydrogen peroxide was produced in a concentration of 2.83 M, corresponding to a solution of about 9.6 wt. %.

EXAMPLE 8

Example 1 was again repeated but the oxygen partial pressure was 250 psi and the hydrogen peroxide produced was found to be in a concentration of 2.18 M, corresponding to a solution of about 9.7 wt. %.

EXAMPLE 9

The procedure of Example 3 was followed with 250 psi of hydrogen and 500 psi of oxygen, but 20 cc. of the acidic solution were employed and 0.01 g. of 5% palladium on activated carbon (Strem) was employed as catalyst for the 2-hour reaction time. At the end of the reaction, the hydrogen peroxide concentration was found to be 2.92 M, which corresponds to a solution of about 9.9 wt. %.

EXAMPLE 10

Example 9 was repeated with the exception that the amount of catalyst was 0.03 g. Hydrogen peroxide produced was in a concentration of 2.64 M, corresponding to a wt. % of about 9.0.

EXAMPLE 11

Example 3 was again repeated using a stainless steel agitator and a reaction time of 1 hour. The hydrogen peroxide was produced in a concentration of 3.09 M, corresponding to a solution of about 10.5 wt. %.

EXAMPLE 12

Example 3 was again repeated using a stainless steel agitator and the amount of catalyst used was 0.0244 g. The hydrogen peroxide was produced in a concentration of 4.87 M, representing a solution of about 16.46 wt. % hydrogen peroxide.

EXAMPLE 13

In this example and in those which follow, no glass liner was employed in the 300 cc. autoclave, which was made of stainless steel. The procedure of Example 3 was followed, but an acidic reaction medium volume of 20 cc. was employed and 0.0426 g. of catalyst was used. The hydrogen peroxide was obtained in 3.62 M concentration, representing a wt. % of 12.09 in the solution.

EXAMPLE 14

Again Example 12 was followed but the amount of catalyst was 0.0216 g. The hydrogen peroxide obtained was 3.83 M, corresponding to a 12.56 wt. % solution.

EXAMPLE 15

Example 13 was again followed but the reaction was carried out for 4 hours to produce 3.95 M hydrogen peroxide or a solution of 12.92 wt. %.

EXAMPLE 16

Again following Example 13 but employing a reaction period of only 1 hour, hydrogen peroxide was produced in a 2.21 M concentration or as a 7.35 wt. % solution.

EXAMPLE 17

Reducing the reaction time to ½ hour, Example 13 was again repeated and the hydrogen peroxide was produced in a 1.53 M concentration, corresponding to a 5.12 wt. % solution.

EXAMPLE 18

Example 13 was again followed but the reaction period was 1 hour and the temperature employed was 25° C. Hydrogen peroxide concentration was 2.19 M or 7.26 wt. % in the solution.

The reaction product, i.e., the hydrogen peroxide solution, is readily separated from the catalyst in conventional manner, e.g., by distillation, filtration, decantation, and the like. Similarly, the hydrogen peroxide solution can be concentrated, if desired, in conventional manner, e.g., by distillation.

The volume of the reaction mixture occupies a relatively small portion of the available volume of the reactor, e.g., up to about 5%, and the stirrer extends close to the bottom as specified, and close to the walls by about the same distance so that when it is rapidly rotated, it not only creates the continuous layer of no more than about 2 millimeters in thickness of the reaction mixture along the bottom, but also causes the reaction mixture to climb the walls of the reactor so that the desired 2 millmeter maximum thickness of reaction mixture is produced.

I claim:

1. A process for producing hydrogen peroxide which comprises reacting hydrogen and oxygen in an acidic aqueous solution containing suspended therein a supported Group VIII noble metal catalyst in a system wherein the reaction medium has a thickness of at most about 2 millimeters.

2. A process as defined in claim 1, wherein the Group VIII noble metal is palladium.

3. A process as defined in claim 1, wherein the support is selected from the group consisting of activated carbon and silica.

4. The process of claim 2 wherein said palladium is 2-5 wt. % of said support.

5. The process of claim 1 wherein the concentraction of said supported catalysts is 0.01-1 wt. % of said solution.

6. The process of claim 1 wherein said solution contains substantially no organic component.

7. The process of claim 1 wherein said process is carried out at a pressure of 500-2000 psig and a temperature of 0°-30° C.

8. The process of claim 1 wherein the molar ratio of oxygen to hydrogen is from 3/1 to 0.5/1.

9. The process of claim 1 wherein the concentration of hydrogen ion in said mixture is 0.1-1 molar.

10. The process of claim 1 wherein the hydrogen and oxygen are substantially free of carbon monoxide.

11. A process for producing hydrogen peroxide which comprises reacting substantially carbon monoxide-free hydrogen and oxygen in a substantially organic component-free aqueous solution having a 0.1-1 molar concentration of hydrogen ion, said solution containing suspended therein 0.01-1 wt. % of a supported catalyst containing 2-5 wt. % palladium, said reaction being carried out at a pressure of 500-2000 psig, a temperature of 0°-30° C., and a molar ratio of $O_2H_2$ of 3/1 to 0.5/1 and where the liquid reaction medium has a thickness of at most about 2 millimeters.

* * * * *